United States Patent [19]

Barnaby

[11] Patent Number: 4,798,006
[45] Date of Patent: Jan. 17, 1989

[54] VIBRATION ISOLATION MEANS

[75] Inventor: Anthony B. Barnaby, Leicester, England

[73] Assignee: Rank Taylor Hobson Limited, United Kingdom

[21] Appl. No.: 18,021

[22] Filed: Feb. 24, 1987

[30] Foreign Application Priority Data

Feb. 25, 1986 [GB] United Kingdom ............... 8604596

[51] Int. Cl.$^4$ ............................................. G01B 21/00
[52] U.S. Cl. ...................................... 33/573; 33/1 M; 33/549; 33/503
[58] Field of Search ................. 33/503, 504, 505, 549, 33/550, 551, 553, 555, 556, 558, 573, 1 M; 248/638, 661, 662

[56] References Cited

U.S. PATENT DOCUMENTS

| 3,490,728 | 1/1970 | Stenstrom . |
| 3,565,386 | 2/1971 | Lemkuil . |
| 3,625,466 | 12/1971 | Marshall . |

FOREIGN PATENT DOCUMENTS

| 0038532 | 10/1981 | European Pat. Off. . |
| 932779 | 4/1948 | France . |
| 0149909 | 8/1985 | Japan ................ 33/1 M |
| 553793 | 6/1943 | United Kingdom . |
| 658898 | 10/1951 | United Kingdom . |
| 665079 | 1/1952 | United Kingdom . |
| 1209614 | 10/1970 | United Kingdom . |
| 1452280 | 10/1976 | United Kingdom . |
| 1570751 | 7/1980 | United Kingdom . |

*Primary Examiner*—Harry N. Haroian
*Attorney, Agent, or Firm*—Lerner, David, Littenberg, Krumholz & Mentlik

[57] ABSTRACT

In a metrological or other sensitive apparatus, the transducer or other operative member (22) is mounted on a support structure (14 to 18) which is carried on a chassis (2) by a first set of dampers or isolating means (10) and the chassis (2) is mounted on the floor by a second set of dampers or isolating means (6). The two sets (10, 6) have different natural frequencies and the first set (10) is arranged so that any vibration of the support structure tends to be rotational centered in the zone of operation (21) of the transducer or other member. This is achieved by arranging that the stiffness of the first set of dampers (10) is higher in the direction (24) passing through the zone of operation (21) than in the transverse direction.

24 Claims, 5 Drawing Sheets

VIBRATION ISOLATION MEANS

This invention relates to vibration isolation means and is particularly applicable to metrological apparatus such as rate tables, angular measuring systems and apparatus for the measurement of profile errors including roundness, straightness and surface texture.

It is necessary in the production of precision components to measure the characteristics thereof, such as roundness or surface texture. In the past, it has been necessary to take the component to be tested away from the production line in the factory to a special measuring room which contains various metrological apparatus and which is at a location in which floor vibrations are at a minimum in order to avoid the measurements made being influenced by external vibrations. This has involved considerable inconvenience in the past due to the need to take the component to be tested to the measuring room. There is accordingly a need for a metrological apparatus which is sufficiently insensitive to floor vibrations that it may be located near to a production line. Similar needs may also arise in other situations, for example in any high precision apparatus in which any operation to be carried out, whether it be a measuring or observing or machining operation for example, may be affected by external vibrations.

Accordingly, the invention is aimed at providing an improved vibration damping or isolating arrangement.

In one aspect, the invention provides a vibration isolation arrangement comprising a frame adapted to be mounted on a support such as a floor and provided with frame isolation means between the frame and the floor, and a base mounted on the frame by base isolation means. Preferably the frame isolation means and the base isolation means have different natural frequencies.

In an alternative aspect, the invention provides an apparatus for supporting a member, such as a transducer, sensitive to vibration, in which damping means is arranged so that vibrational energy is dissipated primarily by vibration in a direction in which the effect of the vibration on said member is at least low or preferably a minimum.

The invention is described further by way of example with reference to the accompanying drawings, in which.

Figure 1:
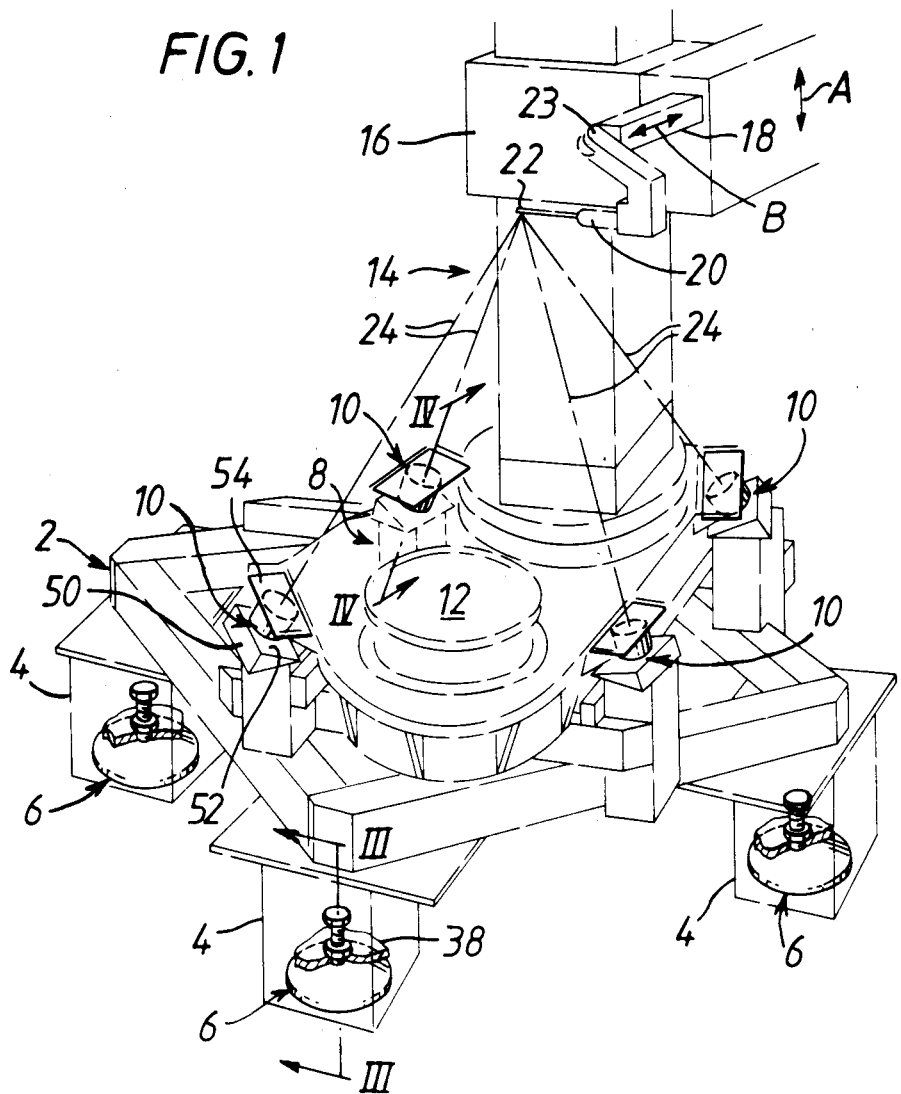
FIG. 1 is a diagrammatic perspective view of a metrological apparatus incorporating an embodiment of the present invention.
Figure 2:
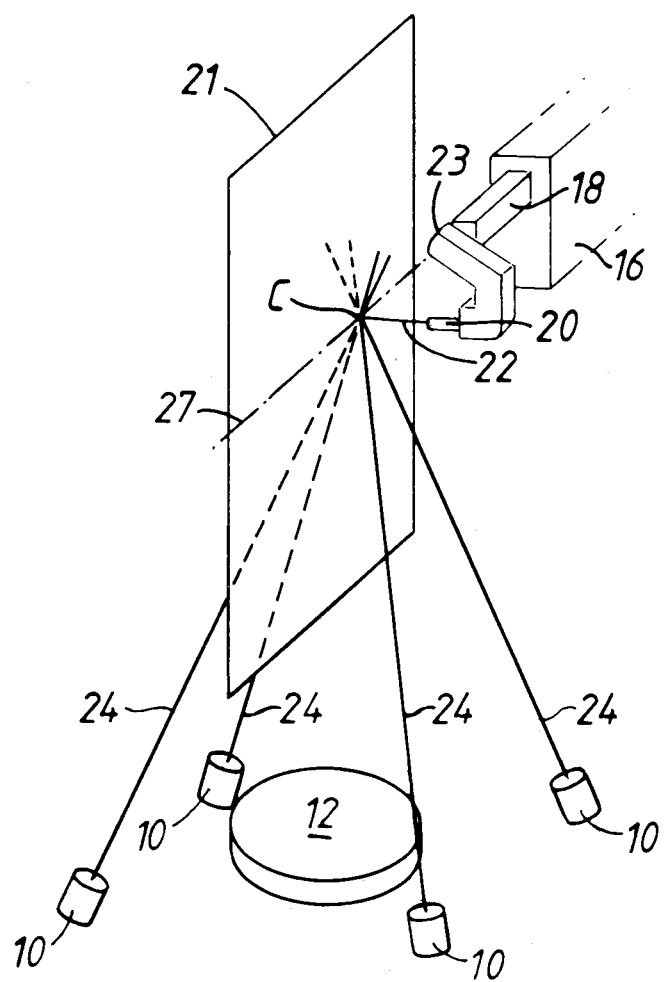
FIG. 2 is a diagram further illustrating the embodiment of FIG. 1.

With reference to the accompanying drawings, the metrological apparatus comprises a massive main frame or chassis 2 having four legs 4 (only three of which can be seen in FIG. 1) each of which is provided at its bottom with a frame isolating mount 6 which supports the apparatus on the floor (not shown in FIG. 1). A base 8 is mounted on the main frame 2 by means of four base isolating mounts 10 and carries a motor driven turntable 12 for supporting a workpiece (not shown) to be measured and a vertical column 14. A motor driven carriage 16 is vertically movable, as indicated by arrow A, on the column 14. A motor driven arm 18, mounted on the carriage 16 for horizontal movement as indicated by arrow B, carries a transducer 20 having a stylus 22 for engaging the surface of a workpiece when mounted on the turntable 12 so that various characteristics of the workpiece, such as roundness, straightness or surface roughness, may be measured. By effecting vertical movement of the carriage 16 and horizontal movement of the arm 18, the tip of the stylus 22 can be moved any where within a rectangular zone of operation 21 which is illustrated in FIG. 2. The zone of operation 21 is located substantially in a vertically extending radial plane of the turntable 12. A knuckle joint 23 permits the transducer 20 and stylus 22 to be moved, relative to the arm 18, from the horizontal position shown in FIG. 1 to a position in which the stylus 22 is vertical. The knuckle joint 23 is such that the tip of the stylus 22 remains substantially in the plane 21 regardless of whether the stylus is in the horizontal or the vertical position.

In operation of the apparatus as so far described, a workpiece whose surface is to be measured is placed upon the turntable 12 and then the turntable 12, carriage 16 and arm 18 are moved, preferably under the control of a computer system (not shown) so that the surface of the workpiece is traversed by the stylus 22 whereby the transducer 20 outputs a signal representative of surface characteristics.

The apparatus under description is manufactured to the highest standards of precision and is intended for detecting the minutest variations in the parameters to be measured, and in particular is intended to take measurements of the order of a micron or less. Accordingly, the minutest of vibrations experienced by the transducer 20 or stylus 22 may invalidate the measurements being made. The base isolating mounts 6 and frame isolating mounts 10 are provided and arranged for substantially eliminating the transmission of externally originating vibrations to the transducer 20 or stylus 22. This is achieved in the embodiment illustrated in the drawings by a combination of two measures. One of these measures involves arranging that the natural frequency at which the massive frame 2 may oscillate on the frame isolating mounts 6 is different from that at which the base 8 may oscillate on the base isolating mounts 10. In other words, the in situ natural frequency of the base isolating mounts 10 is different from that of the frame isolating mounts. Preferably the in situ natural frequency of the frame isolating mounts 6 is lower than that of the base isolating mounts 10. Typically the in situ natural frequency of the mounts 6 may be in the range 9 to 11 Hz and that of the mounts 10 may be in the range 15 to 20 Hz, preferably in the ratio range of about 1:1.5 to 1:2.

The second of the measures involves utilising for the base isolating mounts 10 members which have a higher stiffness along a line 24 passing through the zone of operation 21 of the stylus 22 than the stiffness in a direction transverse thereto. Preferably, the ratio of these two stiffnesses is 5:1. As shown in FIGS. 1 and 2, the lines 24 all pass through a point C located substantially within the zone of operation 21 at substantially the centre thereof. With this arrangement, any vibrations transmitted to the base isolating mounts 10 from the floor will tend to result in only minute rotary oscillation of the table 8 about a point in the zone of operation of the stylus 22 so that the effect of this vibration on the stylus 22 is almost negligible. Since the stylus 22 may be moved horizontally and vertically it will not always be located precisely at the point at which vibrations have the minimal effect i.e. the susceptibility of the apparatus to vibration will vary to a degree according to the position of the stylus within its zone of operation 21. Nevertheless, the arrangement under description does provide a major improvement compared to machines at present available and is such that the apparatus may operate in locations, such as adjacent a production line, where hitherto it has not been possible to operate metrological apparatus due to susceptibility to vibration.

Further, in order to minimise the effect of any vibrations which are transmitted to the base 8, the centre of gravity of the structure comprising the base 8, turntable 12, column 14, carriage 16, arm 18 and transducer and stylus 20, 22 should be located as low as possible. The embodiment illustrated may be constructed such that the centre of gravity of this structure is at a level about two or more inches below the surface of the turntable 12. Of course, in operation of the apparatus, the actual location of the centre of gravity will move as the carriage 16 and/or arm 18 move. Further, when a workpiece is placed on the turntable, the centre of gravity of the structure including the workpiece will depend upon the nature of the workpiece and its position and orientation on the turntable.

Preferred forms of the isolating mounts 6 and 10 will now be described with reference to FIGS. 3 to 5 of the accompanying drawings.

Figure 3:
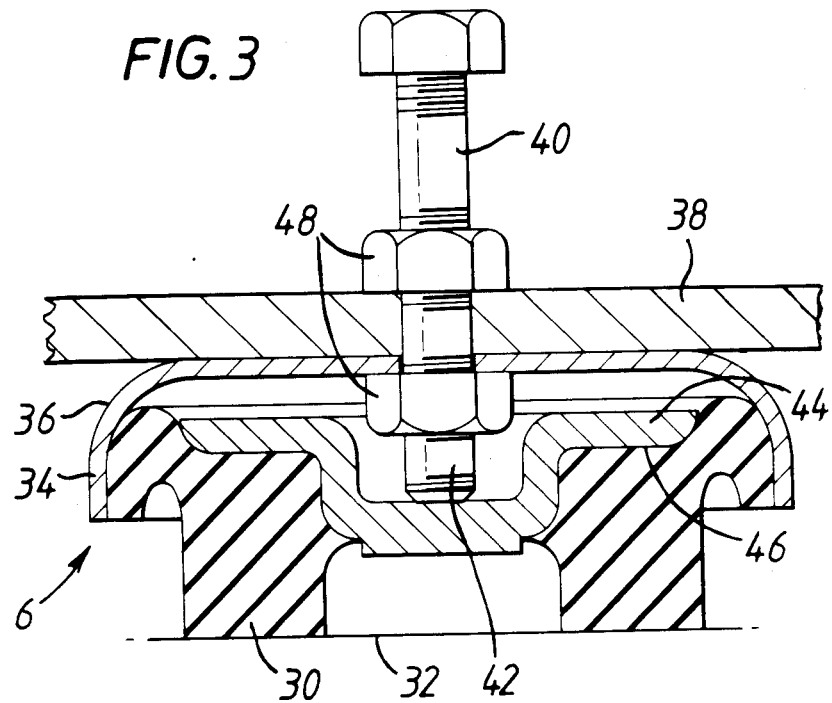
FIG. 3 is a section on the line III—III of FIG. 1.

As shown in FIG. 3, each frame isolating mount 6 comprises a resilient pad 30, preferably of neoprene rubber, which rests on the floor 32 and which is bonded at 34 to the inside of a steel bell-shaped housing 36. The housing 36 is secured to the underside of a horizontal plate 38 which forms a part of the leg 4, by means of a bolt 40, the lower end 42 of which engages the inside surface of a steel flanged cup 44 to which the pad 30 is bonded at 46. The bolt 40 is provided with lock nuts 48 and arranged so that levelling of the apparatus may be achieved by adjustment of the bolts 40, such adjustment causing adjustment of the degree to which the pads 30 project below the housing 36.

Figure 4:
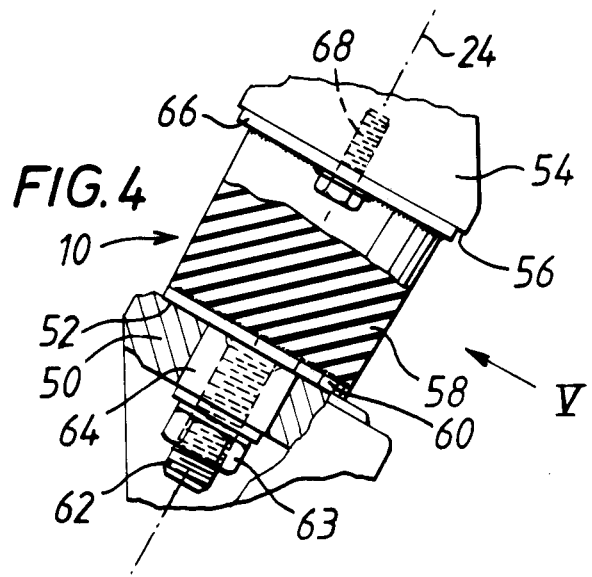
FIG. 4 is a section on the line IV—IV of FIG. 1.
Figure 5:
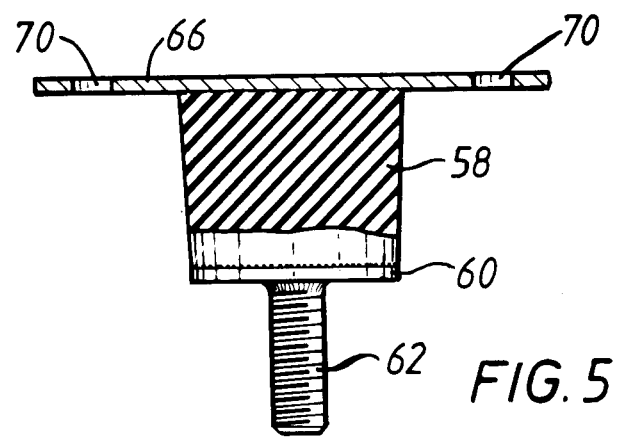
FIG. 5 is a view on the arrow V shown in FIG. 4.

As shown in FIG. 4, each base isolating mount 10 is secured between a bracket 50 of the main frame 2 having a support surface 52 at right angles to the direction 24, and a bracket 54 of the table 8 having a support surface 56 parallel to the surface 52. As seen in both FIGS. 4 and FIG. 5, base isolating mounts 10 comprises a frustoconical resilient pad 58, preferably of neoprene rubber, having an axial stiffness greater than its transverse stiffness preferably in the ratio 5:1 and arranged with its narrow end lowermost and its axis coincident with line 24. A circular steel plate 60 is bonded to the lower end of the pad 58 and has a stud 62 welded thereto and passing through an opening 64 in the bracket 50, which is of larger diameter than the stud 62 to permit adjustment. A nut 63 on the stud 62 secures the plate 60 to the surface 52 of bracket 50. A plate 66 is bonded to the upper end of the pad 58 and is secured by studs 68, passing through openings 70, to the surface 56 of the bracket 54. Isolating mounts 6 and 10 as illustrated in the drawings may be obtained from Cementation (Muffelite) Limited of Hersham, Walton-on-Thames, Surrey, England.

Figure 6:
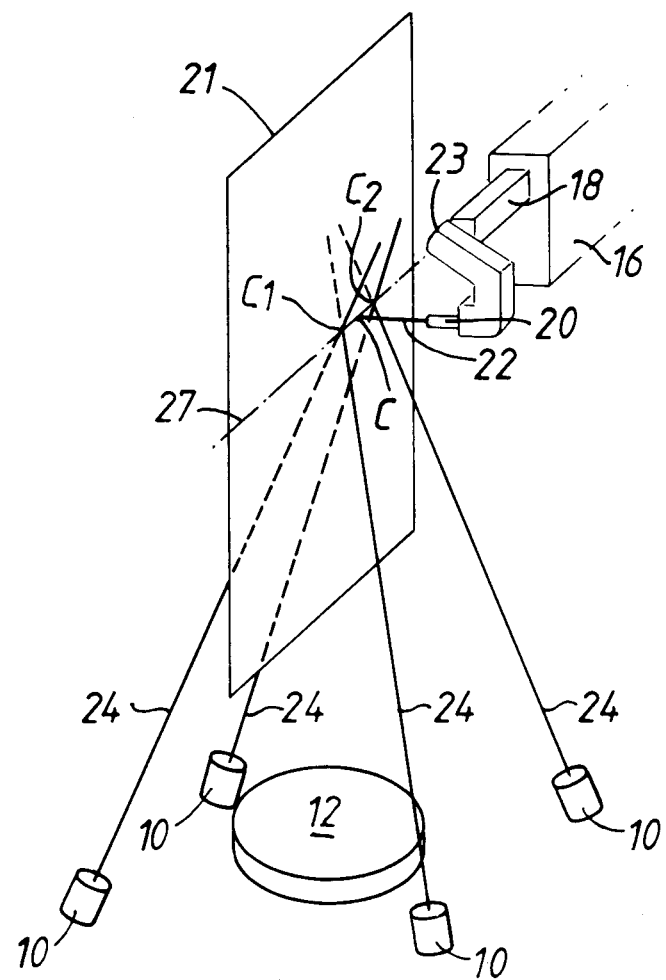
FIG. 6 is a diagram similar to FIG. 2 showing a modification to the embodiment of FIG. 1.

In the modified embodiment illustrated in FIG. 6, the base isolating mounts 10 are arranged so that the lines 24 substantially intersect at two points C1 and C2, rather than at a single point as in the previous embodiment. The points C1 and C2 are spaced apart on a horizontal line 27 which substantially bisects the rectangular zone of operation 21 of the stylus 22 with the points C1 and C2 being substantially equispaced on opposite sides of the centre C of the rectangular zone 21. Thus, when the transducer 22 is positioned on the line 27, the best isolation against vibration is provided with the degree of isolation achieved decreasing as the stylus 22 is moved further from the line 27.

Although in FIG. 2 all four lines 24 substantially intersect at a single point C at about the centre of the zone of operation 21 and in FIG. 6 the lines 24 substantially intersect at two points C1 and C2, arrangements are possible in which none of the lines 24 intersect each other. Thus, each line 24 may pass through the zone of operation 21 at a point different from each of the other lines 24. Further, although it is preferred that the lines 24 should pass through the zone 21 near to the centre thereof, i.e., that the first directions of the individual base isolating mounts should converge near the center of zone 21, this is not essential, but it is preferred in order to minimise the effects of vibration throughout the whole of the zone of operation 21 of the stylus 22.

Various other modifications are possible. For example, although in the embodiment illustrated in the drawings the transducer is mounted for movement horizontally in only one direction, it would be possible to apply the invention to structures in which the transducer is movable horizontally in two directions. In this case, the zone of operation of the transducer will be a solid volume rather than a plane area and the mounts 10 would be arranged so that the lines 24 pass through this solid volume of operation. Further, the invention can be applied to instruments in which the workpiece is supported on a stationary table, rather than a rotary table, and the transducer is caused to traverse the surface of the workpiece solely by movement of the transducer while the workpiece is held stationary.

Although preferred forms of mount have been illustrated in the drawings, a variety of other forms may be employed but those illustrtated are particularly advantageous.

Although the invention is particularly applicable to metrological apparatus and has been illustrated therein, it may also be applied to apparatus in which a member other than a stylus/transducer is provided for performing an operation on or in relation to the surface of an object. An example of such other apparatus, is a machine tool. When applied to a machine tool, the lines 24 would pass through the zone in which the machining member, such as a grinding wheel, is operable.

Although the mount 58 in the preferred embodiment is frustoconical and mounted with the wider portion uppermost, it would be possible to use this type of mount the other way up. Forms of mount other than the mount 58 could be employed. For example, although in the illustrated embodiment, four mounts 58 have been provided, it is within the scope of the invention that any form of isolating means having a higher stiffness in one direction than in a transverse direction may be employed.

I claim:

1. Apparatus for carrying out an operation on an object, comprising:
   a base for supporting the object;
   a device connected to said base for performing said operation in a defined zone of operation;
   a plurality of base isolating mounts each having a higher stiffness in a first direction than in a second direction transverse to said first direction, said base isolating mounts being connected to said base so that said first directions of said base isolating mounts converge in said zone of operation; and means for supporting said base isolating mounts on a floor so that said base is supported through said base isolating mounts.

2. Apparatus for sensing the surface of an object comprising:

a base for supporting an object whose surface is to be sensed;

a surface sensor connected to said base;

means for effecting relative movement between the object and the sensor so that said sensor is effective in a zone of operation thereof for traversing and sensing the surface of the object; a plurality of base isolating mounts each having a higher stiffness in a first direction than in a second direction transverse to said first direction, said base isolating mounts being connected to said base so that said first directions of said base isolating mounts converge in said zone of operation; and means for supporting said base isolating mounts on a floor so that said base is supported through said base isolating mounts.

3. Apparatus according to claim 2, including a turntable mounted on said base whereby said object may be supported on said base by said turntable.

4. Apparatus according to claim 3, wherein said sensor is movable vertically and horizontally relative to said base.

5. Apparatus according to claim 2, wherein said zone of operation is substantially a plane.

6. Apparatus according any of to claim 2 wherein said zone of operation is a volume.

7. Apparatus according to claim 2 wherein each said base isolating mount is of circular cross-section, said first direction being the axial direction.

8. Apparatus according to claim 7, wherein each said base isolating mount is frustoconical.

9. Apparatus according to claim 2, wherein each said base isolating mount comprises a substantially solid pad of natural or synthetic rubber.

10. Apparatus according to claim 2, wherein said first directions associated with said respective different base isolating mounts intersect in said zone substantially at a single point substantially in said zone of operation.

11. Apparatus according to claim 10, wherein said single point is substantially at the centre of said zone.

12. Apparatus according to claim 2, wherein said first directions associated with a first group of said base isolating mounts substantially intersect each other at a first point and said first directions associated with a second group of said base isolating mounts substantially intersect each other at a second point, each of said first and second points being substantially in said zone of operation.

13. Apparatus according to claim 12, wherein said first and second points are substantially equi-spaced on opposite sides of the centre of the zone of operation.

14. Apparatus according to claim 12, wherein said first and second points are located on a horizontal line which substantially bisects said zone of operation.

15. Apparatus according to claim 2, having its centre of gravity below the base.

16. Apparatus according to claim 2, wherein said means for supporting said base isolating mounts includes a frame and means for supporting said frame on a floor, said base isolating mounts supporting said base on said frame.

17. Apparatus according to claim 16, said base and said frame each having respective surfaces, each said base isolating mount being located between one said surface of said chassis and one said surface of said base to support said base on said frame, said surfaces of said frame and said base associated with each said base isolating mount extending at right angles to the first direction of such base isolating mount.

18. Apparatus according to claim 16 wherein said means for supporting said frame includes frame isolating means supporting said frame.

19. Apparatus according to claim 18, wherein said frame isolating means has an in situ natural frequency which is different from that of said base isolating mounts.

20. Apparatus according to claim 19, wherein said frame isolating means comprises a plurality of separate frame isolating mounts.

21. Apparatus according to claim 20, wherein each said frame isolating mount of said frame isolating means comprises a substantially solid pad of natural or synthetic rubber.

22. Apparatus according to claim 20, wherein each said frame isolating mount of said frame isolating means includes level adjusting means.

23. Apparatus according to claim 2, which is a metrological apparatus.

24. Metrological apparatus for measuring a characteristic of a workpiece, the apparatus comprising a base, a sensor susceptible to external vibrations mounted to said base, a frame, base isolating means for supporting said base on said frame, and frame isolating means for supporting said frame on a floor, said base isolating means and said frame isolating means each having an in situ natural frequency of vibration, said natural frequency of said base isolating means differing from said natural frequency of said frame isolating means.

* * * * *